United States Patent
Sutherland

(10) Patent No.: US 11,969,886 B2
(45) Date of Patent: Apr. 30, 2024

(54) VALVE DEVICE FOR A VACUUM HANDLING DEVICE OR A VACUUM CLAMPING DEVICE

(71) Applicant: J.Schmalz GmbH, Glatten (DE)

(72) Inventor: Kelson Sutherland, Raleigh, NC (US)

(73) Assignee: J.Schmalz GmbH, Glatten (DE)

( * ) Notice: Subject to any disclaimer, the term of this patent is extended or adjusted under 35 U.S.C. 154(b) by 597 days.

(21) Appl. No.: 17/335,544

(22) Filed: Jun. 1, 2021

(65) Prior Publication Data
US 2022/0379495 A1    Dec. 1, 2022

(51) Int. Cl.
*B25J 15/06* (2006.01)
*F16K 31/122* (2006.01)

(52) U.S. Cl.
CPC ....... *B25J 15/0633* (2013.01); *F16K 31/1221* (2013.01)

(58) Field of Classification Search
CPC ............... B25J 15/0633; B25J 15/0625; B25J 15/0691; F16K 31/1221
USPC ................................................ 294/186, 189
See application file for complete search history.

(56) References Cited

U.S. PATENT DOCUMENTS

| | | | | |
|---|---|---|---|---|
| 5,419,686 A | * | 5/1995 | Wissmann | F04B 53/1065 123/73 C |
| 6,517,050 B1 | * | 2/2003 | Pabst | B65G 47/91 251/339 |
| 7,000,964 B1 | * | 2/2006 | Porras | B65G 47/917 294/186 |
| 8,251,415 B2 | * | 8/2012 | Lomerson, Jr. | B25J 15/0616 901/40 |
| 10,643,879 B2 | * | 5/2020 | Hsu | H01L 21/6835 |
| 2006/0131905 A1 | * | 6/2006 | Mazzucchelli | B65G 47/91 294/188 |
| 2007/0148009 A1 | * | 6/2007 | Cho | F04F 5/467 417/174 |
| 2016/0312783 A1 | * | 10/2016 | Tirgovet | F16K 15/16 |

FOREIGN PATENT DOCUMENTS

| | | |
|---|---|---|
| EP | 1970608 A1 | 9/2008 |
| JP | 05187430 A | 7/1993 |

* cited by examiner

*Primary Examiner* — Paul T Chin
(74) *Attorney, Agent, or Firm* — ASLAN LAW, P.C.

(57) ABSTRACT

A valve device comprising a valve housing with a flow channel having a fluid outflow side and a fluid inflow side, a leaf spring having a fastening portion and a free portion. The fastening portion is connected to the valve housing such that, in a closed configuration, the free portion bears against a valve seat and that, in order to bring about an open configuration, the free portion, from the closed configuration, can be elastically bent away from the valve seat, and an actuating device which is designed to transfer the leaf spring from the closed configuration to an open configuration against an elastic reset force of the leaf spring.

20 Claims, 2 Drawing Sheets

VALVE DEVICE FOR A VACUUM HANDLING DEVICE OR A VACUUM CLAMPING DEVICE

The invention relates to a valve device, in particular for a vacuum handling device or a vacuum clamping device.

Such valve devices are used to be able to optionally interrupt or release an air flow through a flow channel. For example, such valve devices are used in vacuum handling devices in order to be able to optionally establish or interrupt a flow connection between a suction gripper and a vacuum generator and thus to be able to suction or place an object onto the suction gripper.

Different possibilities for realizing such valve devices are known in the prior art. The valve devices mentioned usually comprise a sealing element which, in a closed position, bears sealingly against a valve seat and, in an open position, releases a flow path. In addition, a separately designed reset element is usually provided, which is used to transfer the sealing element from the open position back to the closed position. For example, valve devices are known with an electrically actuatable control piston which can be displaced away from its contact with a valve seat in order to release a flow path. The control piston is usually reset to its closed position via a separately designed spiral spring.

The known valve devices are often constructed in a complex manner and, due to their construction, usually require a comparatively large installation space which, e.g., makes it difficult to integrate the valve device into a suction gripper.

The problem addressed by the invention is that of providing a valve device for a vacuum handling device, which has a reliable switching behavior, is easy to produce and has a compact design.

This problem is solved by a valve device having the features of claim 1.

The valve device is designed in particular for use in a vacuum handling device or a vacuum clamping device. The valve device comprises a valve housing which delimits a flow channel. The flow channel has a fluid outflow side, e.g., for connecting to a vacuum supply device, and a fluid inflow side, e.g., for connecting to a suction device. In particular, the fluid inflow side and fluid outflow side can be provided opposite one another on the flow channel. In this respect, the flow channel can in particular extend essentially between the fluid inflow side and the fluid outflow side.

The valve device also comprises an elastic leaf spring. The leaf spring has a fastening portion and a free portion. The fastening portion is connected to the valve housing such that, in a closed configuration of the leaf spring, the free portion bears against a valve seat for sealing the fluid outflow side from the fluid inflow side and that, in order to bring about an open configuration of the leaf spring, the free portion, from the closed configuration, can be elastically bent away from the valve seat such that, in the open configuration, a flow path from the fluid inflow side to the fluid outflow side is released. In this respect, the free portion in the open configuration of the leaf spring is bent away from the valve seat such that a flow path from the fluid inflow side to the fluid outflow side is released. The leaf spring has an intrinsic elastic reset force in particular such that the free portion is applied in the direction of the closed configuration.

The valve device also comprises an actuating device which is designed to transfer the leaf spring from the closed configuration to the open configuration against the intrinsic elastic reset force of the leaf spring. In this respect, the actuating device is designed to bend the free portion of the leaf spring away from the valve seat against the elastic reset force such that a flow path from the fluid inflow side to the fluid outflow side is released. In particular, when the free portion of the leaf spring is bent, a reset force is generated which is applied to the free portion of the leaf spring in the direction of the closed configuration. In this respect, the leaf spring can be transferred from the open configuration back to the closed configuration, in particular due to its elastic reset force.

The leaf spring is thus used to seal the fluid inflow side from the fluid outflow side and provides a reset force which returns the leaf spring from the open configuration back to the closed configuration. In other words, the leaf spring is both a sealing element and a reset element. Such a valve device has a simple and compact design, which, e.g., allows for a simple integration into a suction gripper. In addition, a valve device configured in this way is functionally reliable because there are comparatively few moving parts present.

Since the leaf spring is applied in the direction of the closed configuration due to its intrinsic elastic reset force, a good sealing effect and thus a reliable switching behavior is also achieved. In particular, when negative pressure is applied, the leaf spring is additionally suctioned onto the valve seat. In the present context, negative pressure denotes in particular that the pressure on the fluid outflow side is lower than that on the fluid inflow side. It is conceivable, for example, that the flow channel is connected to a vacuum generating device on its fluid outflow side. It is also conceivable that the flow channel is connected to the atmospheric environment on its fluid outflow side and an overpressure is applied to the fluid inflow side.

Such a valve device can be used, for example, to optionally interrupt or optionally release an air flow between a vacuum generating device and a suction gripping device. For example, the flow channel can be fluidically connected on its fluid inflow side to a suction body of a suction gripper. In principle, it is also conceivable that the fluid inflow side of the flow channel is connected to the atmospheric environment. The valve device can then be used, for example, to ventilate a valve chamber if necessary.

A structurally simple and robust design can be provided in that one side of the leaf spring is clamped in on the valve housing. In particular, the free portion can be integral with the fastening portion. The fastening portion can be detachably fastened to the valve housing, for example, by means of a fastening screw. It is also possible for the leaf spring to be riveted or welded to the valve housing.

The flow channel preferably opens out between the fastening portion and the free portion of the leaf spring. In particular, the flow channel has an inflow opening on its fluid inflow side. In this case, it can be advantageous if the leaf spring is designed such that, in the closed configuration, in particular with its free portion, it covers the inflow opening, in particular covers it completely. The valve seat can then be formed in particular by a housing portion of the valve housing surrounding the inflow opening. Such a design is particularly easy to produce. For example, it is conceivable that the flow channel is formed by a bore in the valve housing and a bore opening forms the inflow opening. For particularly good sealing, it can also be advantageous if a sealing device, for example, in the form of a sealing ring, is provided which acts between the housing portion and the leaf spring.

In the context of an advantageous embodiment, the actuating device can have an actuatable actuating piston which can be displaced between an initial position and an actuating position. In particular, the actuating piston can be guided in a clearance fit. The actuating piston interacts in particular with the leaf spring such that the leaf spring is transferred from the closed configuration to the open configuration when the actuating piston is displaced from the initial position to the actuating position.

The actuating piston can be actuated, for example, electrically or magnetically. However, it is particularly preferred if the actuating piston can be actuated pneumatically, in particular by compressed air. Such a pneumatic design is structurally simple and reliable in handling. Optionally, the valve device can then comprise a, for example, electrically controllable, control valve which is designed to control a pressure fluid supply to the actuating piston. It is conceivable, for example, that the control valve can be controlled in a wired or wireless manner, for example, by radio, which allows for an automated switching process of the valve device.

In particular, the actuating device is designed such that the actuating piston is transferred from the initial position to the actuating position when actuated, in particular when pressure fluid is applied along an actuating direction. In this respect, the leaf spring is transferred to the open configuration when the actuating piston is actuated. The actuating piston and the leaf spring are preferably designed such that, after the actuation has been switched off, in particular after the application of pressure fluid has been switched off, the actuating piston is returned from the actuating position to the initial position by the elastic reset force of the leaf spring. The leaf spring, in particular due to its elasticity, can therefore automatically reset the actuating piston when the pressure fluid application is removed. The leaf spring is therefore both a sealing element for sealing the flow channel and a reset element for the actuating piston. Such a configuration is structurally simple and allows for a reliable operation. In particular, the actuation piston only needs to be actuated unidirectionally. In particular, the actuating device can therefore be designed to transfer the actuating piston from the initial position to the actuating position, but not vice versa.

In particular, the actuating piston interacts with the leaf spring such that, when actuated, the actuating piston pushes the leaf spring, in particular the free portion of the leaf spring, away from its contact with the valve seat and thereby bends it elastically. However, the actuating piston and the leaf spring are preferably not firmly connected to one another.

It is possible for the actuating piston to be arranged such that, as seen looking along a direction from the fastening portion of the leaf spring to the free portion of the leaf spring, the valve seat, in particular the inflow opening of the flow channel, is arranged first, followed by the actuating piston. In such a configuration, a bending of the leaf spring by the actuating piston is facilitated due to the lever effect. It is also possible that the actuating piston is arranged such that, as seen looking along a direction from the fastening portion of the leaf spring to the free portion of the leaf spring, the actuating piston is arranged first, followed by the valve seat, in particular the inflow opening of the flow channel. Such a configuration makes it possible to achieve a comparatively large opening cross section at a comparatively small stroke of the actuating piston.

For a reliable sealing of the flow channel, it can also be advantageous if the leaf spring is designed such that it, in particular the free portion, is applied in the closed configuration by its intrinsic elastic reset force to the valve seat, i.e., in particular pressed against the valve seat by its reset force, thus sealing it. However, it is also conceivable that the leaf spring is applied in the direction of the closed configuration, but a complete sealing only takes place by suctioning the leaf spring when negative pressure is applied.

In particular, the actuating device and the leaf spring are designed and arranged such that, proceeding from the closed configuration, the leaf spring can be transferred to the open configuration against a fluid pressure or flow pressure acting on the leaf spring. In this respect, the actuating device and the leaf spring can in particular be designed and arranged such that the free portion of the leaf spring can be bent away from its contact with the valve seat against a fluid pressure or flow pressure acting on it. In other words, when the actuating piston is actuated, the leaf spring is transferred to the open configuration, in particular against a fluid pressure acting from the fluid inflow side to the fluid outflow side of the flow channel. In such a configuration, a reset movement of the leaf spring from the open configuration to the closed configuration is supported by the fluid pressure, which facilitates a particularly reliable sealing.

In particular, the leaf spring can be made, in particular consist, of steel, stainless steel, plastic, fiber composite plastic or elastomer. The leaf spring, in particular the free portion of the leaf spring, can advantageously be formed by a spring tongue which is formed in a flat material. For example, it is conceivable that the free portion of the leaf spring is punched out or cut out from a flat material, for example, from sheet steel. In particular, the free portion and the fastening portion of the leaf spring can be designed to be integral, preferably monolithic.

In order to be able to limit a maximum permissible volume flow through the flow channel, it can be advantageous if a stop is provided to delimit a bending path of the leaf spring, in particular of the free portion of the leaf spring. In particular, the stop can be designed to be adjustable, in particular continuously adjustable. It is thus possible to variably adjust an opening cross section of the flow channel and thus a maximum permissible volume flow through the flow channel. The stop is preferably designed such that it can be adjusted by a user from the outside. For example, it is conceivable that the stop is formed by an adjusting screw guided in the valve housing.

In the context of an advantageous development, the flow channel, on its fluid inflow side, in particular with its inflow opening, can open into a valve chamber of the valve housing. The valve chamber can in particular have a suction connection for connecting to a suction body. The leaf spring is preferably arranged inside the valve chamber, in particular fastened to a wall of the valve housing delimiting the valve chamber. In this respect, the leaf spring is protected from external influences, which facilitates a reliable functioning of the valve device. In addition, such a valve device has a particularly compact design which allows for the valve device to be easily integrated into a suction gripper.

In addition, it can be advantageous if the actuating piston is movably guided in a guide within the valve housing, preferably in a clearance fit. In particular, the actuating piston protrudes in the actuating position into the valve chamber, in particular with a piston tip. In order to prevent pressure fluid from entering the valve chamber when it is applied to the actuating piston, it can also be advantageous if the actuating piston comprises a sealing element, in particular in the form of a sealing ring. In particular, in the actuating position of the actuating piston, the sealing element can bear axially against a sealing seat, e.g., against a contact portion of the valve housing.

In the context of an advantageous development, the valve chamber can have a fluid connection for connecting to an overpressure supply. This makes it possible to quickly ventilate the valve chamber if necessary. In particular, it is also conceivable for compressed air to be supplied via the fluid connection to blow off an object held on a suction body. It is also conceivable that the valve chamber has a sensor connection for connecting a pressure sensor or a pressure switch. This makes it possible to indirectly monitor the function of the valve device, in particular an opening or closing movement of the leaf spring.

The valve device described above can in particular be part of a suction gripper for gripping objects. In particular, the suction gripper can have a plurality of suction points at which an object can be suctioned by means of negative pressure. It is then particularly conceivable that all suction points are coupled to a single valve device, i.e., a vacuum supply to the suction gripper can be controlled solely by a single valve device. It is also possible that each suction point or a group of a plurality of suction points is assigned its own valve device. Individual suction points or groups of suction points can then be selectively activated or deactivated. This makes it possible to grip and deposit a plurality of objects individually with a single suction gripper. In particular, by switching off unoccupied suction points, leakage can be reduced and thus efficiency increased.

In the following, the invention will be described in more detail using the drawings,
in which.

In the figures and the following description, identical or corresponding features are denoted with the same reference signs.

Figure 1:
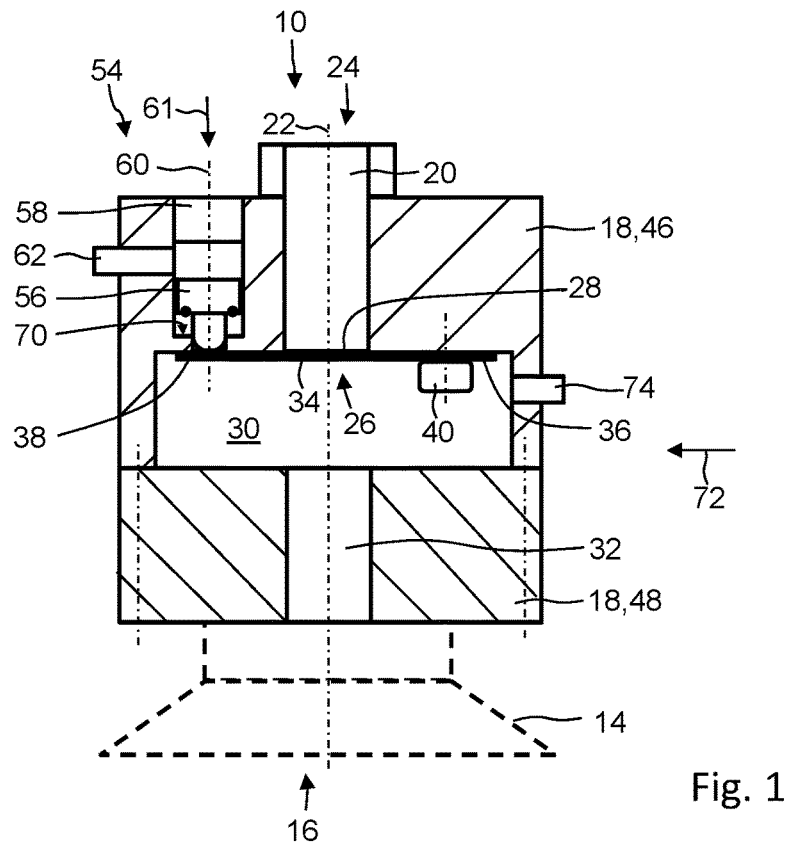
FIG. 1 is a sectional view of an outline of a valve device with a leaf spring in a closed configuration.

FIG. 1 is a sectional view of a valve device which is denoted overall with reference sign 10. The valve device 10 can be, for example, part of a suction gripper 100 shown in FIG. 4. In this case, the valve device 10 can be connected to a suction body 14 which defines a suction point 16 for suctioning an object (not depicted) (described in detail below).

The valve device 10 comprises a valve housing 18 which delimits a flow channel 20. The flow channel 20 extends along a central flow channel axis 22 from a fluid outflow side 24 to a fluid inflow side 26. For example, the flow channel 20 can be connected on its fluid outflow side 24 to a vacuum supply device (not depicted). The flow channel 20 opens on its fluid inflow side 26 with an inflow opening 28 into a valve chamber 30 which is formed within the valve housing 18. As can be seen from FIG. 1, the valve chamber 30 has a suction connection 32 for a flow connection to the suction body 14.

A leaf spring 34, which has a fastening portion 36 and an elastically bendable free portion 38, is arranged in the valve chamber 30. By way of example, the leaf spring 34 extends orthogonally to the flow channel axis 22. As shown in FIG. 1, the leaf spring 34 is fastened with the fastening portion 36 to the valve housing 18 via a fastening screw 40 and covers the inflow opening 28 with its free portion 38.

Figure 3:
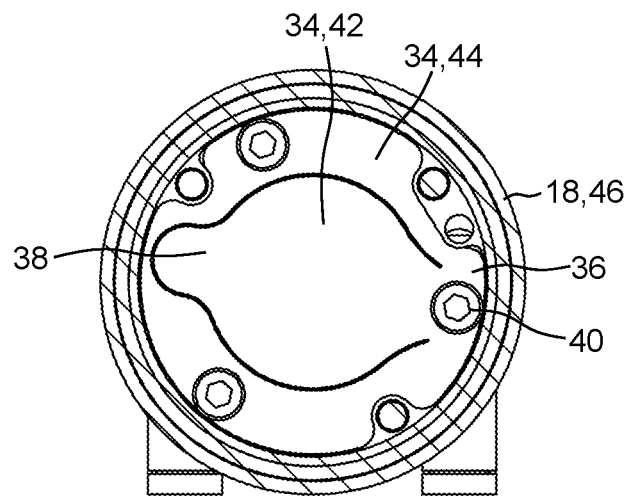
FIG. 3 is a bottom view of an embodiment of the leaf spring.

As shown in FIG. 3, the free portion 38 of the leaf spring 34 can be formed, for example, by a spring tongue 42 which is formed in, for example, punched out from, a flat material 44. In particular, the flat material 44 can be detachably fastened to the valve housing 18 by means of fastening screws 40. An advantageous assembly of the leaf spring 34 can be achieved in that the valve housing 18 is constructed in two parts, having an upper housing part 46 and a lower housing part 48 which can be connected to one another (cf. FIG. 1).

Figure 2:
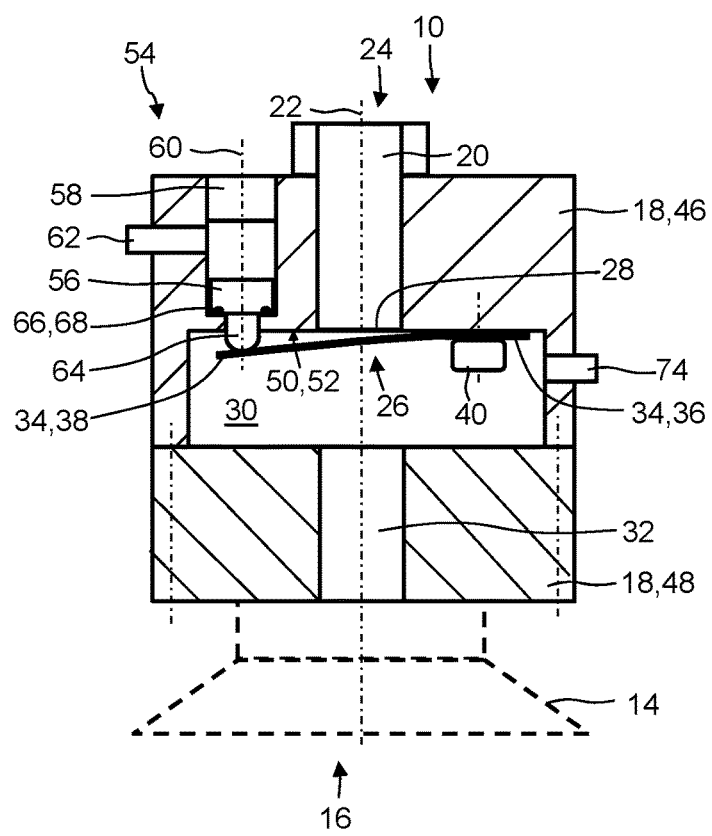
FIG. 2 shows an outline of the valve device according to FIG. 1 with a leaf spring in an open configuration.

The leaf spring 34 can be transferred between a closed configuration shown in FIG. 1 and an open configuration shown in FIG. 2. In the closed configuration, the leaf spring 34 sealingly bears with its free portion 38 against a housing portion 50 (cf. FIG. 2) of the valve housing 18 surrounding the inflow opening 28. The housing portion 50 thus forms a valve seat 52 for the leaf spring. The leaf spring 34 has an intrinsic elastic reset force which is applied to the leaf spring 34 or the free portion 38 of the leaf spring 34 in the direction of the closed configuration. In the closed configuration, the fluid inflow side 26 is sealed off from the fluid outflow side 24, so that a flow path from the fluid inflow side 26 to the fluid outflow side 24 is interrupted. In particular, a sealing device (not depicted), for example, in the form of a sealing ring, surrounding the inflow opening 28 can be provided. As shown in FIG. 2, the leaf spring 34 or the free portion 38 of the leaf spring 34 is bent away from the valve seat 52 in the open configuration such that a flow path from the fluid inflow side 26 to the fluid outflow side 24 is released.

The valve device 10 also comprises an actuating device 54 which is designed to transfer the leaf spring 34 from the closed configuration to the open configuration against the elastic reset force. As can be seen from FIG. 1, the actuating device 54 in the example shown comprises an actuating piston 56 that can be actuated pneumatically, in particular by means of compressed air. The actuating piston 56 is guided in a guide 58 within the valve housing 18 and can be displaced along an actuation axis 60 between an initial position shown in FIG. 1 and an actuating position shown in FIG. 2. By way of example, the actuation axis 60 is arranged parallel to the flow channel axis 22.

Pressure fluid, in particular compressed air, can be applied to, and thus actuate, the actuating piston 56 via a pressure fluid connection 62. In particular, a control valve (not depicted) for controlling a pressure fluid supply and thus for controlling an actuation of the actuating piston 56 can be connected upstream of the pressure fluid connection 62. For example, the control valve can be controlled electrically.

When pressure fluid is applied to the actuating piston 56 along an actuating direction 61, the actuating piston 56 is transferred along the actuation axis 60 from the initial position to the actuating position. For this purpose, the actuating piston 56 with a piston tip 64 bends the free portion 38 of the leaf spring 34 away from the valve seat 52 against the intrinsic reset force of the leaf spring 34, so that a flow path from the fluid inflow side 26 to the fluid outflow side 24 of the flow channel 20 is released. In this respect, the actuating piston 56 transfers the leaf spring 34 from the closed configuration to the open configuration when pressure fluid is applied.

After switching off the actuation, i.e., when the application of compressed air to the actuating piston 56 is removed, the actuating piston 56 is then returned again from the actuating position to its initial position by the intrinsic elastic reset force of the leaf spring 34. In this respect, the leaf spring 34 and the actuating piston 56 once again assume the configuration shown in FIG. 1 (leaf spring 34 in closed configuration, actuating piston 56 in initial position) after the pressure fluid application has been switched off. The leaf spring 34 is therefore both a sealing element for sealing the inflow opening 28 and a reset element for resetting the actuating piston 56 to the initial position.

In order to avoid unwanted leakage of compressed air into the valve chamber 30, the actuating piston 56 comprises a sealing element 66 in the form of a sealing ring 68 in the example shown. The sealing ring 68 is arranged on an end face of the actuating piston 56 and, in the actuating position of the actuating piston 56, bears sealingly against a contact portion 70 (cf. FIG. 1) of the valve housing 18 (cf. FIG. 2).

In the depicted example, the actuating piston 56 and the flow channel 20 are arranged such that, as seen looking along a direction 72 from the fastening portion 36 of the leaf spring 34 to the free portion 38 of the leaf spring 34, the flow channel 20 is arranged first, followed by the actuating piston 56. In the case of embodiments that are not depicted, it is also possible that, as seen looking along direction 72, the actuating piston 56 is arranged first, followed by the flow channel 20 or the valve seat 52.

In the depicted example, the valve chamber 30 also comprises a fluid connection 74 for connecting to an overpressure supply (not depicted). This makes it possible to ventilate the valve chamber 30 if necessary and, for example, to blow off an object held on the suction body 14. In addition, the valve chamber 30 can have a sensor connection (not depicted) for connecting a pressure sensor or a pressure switch.

Figure 4:
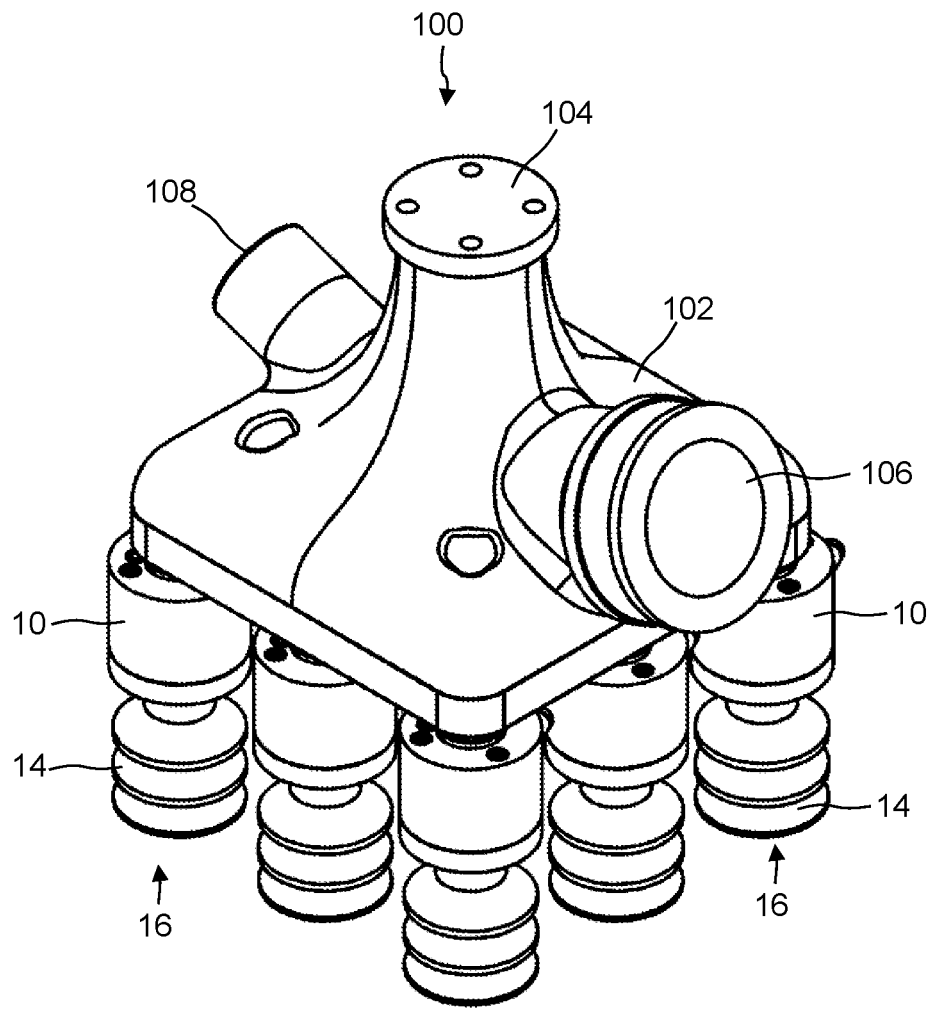
FIG. 4 is a perspective view of a suction gripper comprising a plurality of valve devices according to FIG. 1.

FIG. 4 shows an outline of an exemplary configuration of a suction gripper 100. In the depicted example, the suction gripper 100 is designed as a surface suction gripper and comprises a main part 102 and a plurality of suction bodies 14, e.g., in the form of a bellows. The suction bodies 14 each define a suction point 16 of the suction gripper 100, at which an object can be suctioned onto and thus immobilized on the suction gripper 100. The main part 102 can be connected, for example, to a handling device (not depicted), for example, a robot arm, via a connection device 104.

As can be seen from FIG. 4, a valve device 10 as described above is assigned to each suction body 14 and thus to each suction point 16. In this respect, the suction gripper 100 comprises a plurality of valve devices 10. As already described above with reference to FIG. 1, the valve devices 10 are flow-connected to the respective suction body 14 via the suction connection 32.

The valve devices 10 are fastened on their fluid outflow sides to, and can be supplied with negative pressure via, the main part 102 of the suction gripper 100. For this purpose, the suction gripper 100 has a vacuum connection 106. In particular, the main part 102 can have an internal distributor device which is designed to distribute negative pressure from the vacuum connection 106 to the respective valve devices 10.

In the depicted example, the suction gripper 100 also comprises an overpressure connection 108 for connecting to an overpressure supply, in particular a compressed air supply. In particular, the main part 102 can comprise an internal overpressure distributor which is designed to guide overpressure from the overpressure connection 108 to the respective pressure fluid connections 62 of the valve devices 10.

It is also conceivable that each valve device 10 comprises a control valve (not depicted) as described above. For example, the individual control valves can be designed to be separately controllable, e.g., electrically. The valve devices 10 can then be selectively opened or closed, and individual suction points 16 can thus be selectively activated or deactivated.

The invention claimed is:

1. A valve device comprising:
   a valve housing with a flow channel having a fluid outflow side and a fluid inflow side;
   a leaf spring having a fastening portion and a free portion, wherein the fastening portion is connected to the valve housing, wherein in in a closed configuration, the free portion bears against a valve seat and wherein, in order to bring about an open configuration, the free portion, from the closed configuration, can be elastically bent away from the valve seat; and
   an actuating device which is designed to transfer the leaf spring from the closed configuration to the open configuration against an elastic reset force of the leaf spring.

2. The valve device according to claim 1, wherein the flow channel opens out between the fastening portion and the free portion.

3. The valve device according to claim 1, wherein the flow channel has an inflow opening on its fluid inflow side, wherein the leaf spring covers the inflow opening in the closed configuration.

4. The valve device according to claim 3, wherein the free portion bears against a housing portion of the valve housing surrounding the inflow opening.

5. The valve device according to claim 1, wherein the actuating device has an actuatable actuating piston which can be displaced between an initial position and an actuating position and interacts with the leaf spring such that the leaf spring is transferred from the closed configuration to the open configuration when the actuating piston is displaced from the initial position to the actuating position.

6. The valve device according to claim 5, wherein the actuating piston and the leaf spring are designed such that the actuating piston is transferred from the initial position to the actuating position when actuated and, after the actuation has been switched off, the actuating piston is returned from the actuating position to the initial position by the elastic reset force of the leaf spring.

7. The valve device according to claim 5, wherein the actuating piston interacts with the leaf spring such that, when actuated, the actuating piston pushes the free portion of the leaf spring away from the valve seat.

8. The valve device according to claim 5, wherein the actuating piston is arranged such that, as seen looking along a direction from the fastening portion of the leaf spring to the free portion of the leaf spring, the valve seat is arranged first, followed by the actuating piston or the actuating piston is arranged first, followed by the valve seat.

9. The valve device according to claim 5, wherein the actuatable actuating piston is a pneumatically actuatable actuating piston.

10. The valve device according to claim 1, wherein the leaf spring is designed such that the free portion is applied in the closed configuration by its elastic reset force to the valve seat.

11. The valve device according to claim 1, wherein the actuating device and the leaf spring are designed and arranged such that, proceeding from the closed configuration, the leaf spring can be transferred to the open configuration against a fluid pressure.

12. The valve device according to claim 1, wherein the free portion of the leaf spring is formed by a spring tongue which is formed in a flat material.

13. The valve device according to claim 1, wherein an adjustable, stop is provided to delimit a bending path of the free portion of the leaf spring.

14. The valve device according to claim 1, wherein the flow channel, on its fluid inflow side, opens into a valve chamber of the valve housing, wherein the valve chamber has a suction connection, and wherein the leaf spring is arranged within the valve chamber.

15. The valve device according to claim 14, wherein the actuating piston is movably guided in a guide within the valve housing and in the actuating position protrudes into the valve chamber, wherein the actuating piston comprises a sealing element which, for sealing the guide from the valve chamber, bears against a sealing seat, in the actuating position of the actuating piston.

16. The valve device according to claim 14, wherein the valve chamber has a fluid connection for connecting to an overpressure supply and/or wherein the valve chamber has a sensor connection for connecting a pressure sensor.

17. A suction gripper for gripping objects by suction using negative pressure, comprising at least one valve device according to claim 1.

18. The suction gripper according to claim 17, wherein the suction gripper has a plurality of suction points, wherein each suction point or a group of a plurality of suction points is assigned its own valve device.

19. A vacuum handling device comprising: the valve device according to claim 1.

20. A vacuum clamping device comprising: the valve device according to claim 1.

* * * * *